(12) United States Patent
Zhang et al.

(10) Patent No.: US 10,247,256 B2
(45) Date of Patent: Apr. 2, 2019

(54) CLUTCH ASSEMBLY FOR AUTOMATIC TRANSMISSION

(71) Applicant: Ford Global Technologies, LLC, Dearborn, MI (US)

(72) Inventors: Dengfu Zhang, Northville, MI (US); David Beck, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/372,776

(22) Filed: Dec. 8, 2016

(65) Prior Publication Data

US 2018/0163790 A1    Jun. 14, 2018

(51) Int. Cl.
| | |
|---|---|
| *F16D 13/52* | (2006.01) |
| *F16D 13/64* | (2006.01) |
| *F16D 13/68* | (2006.01) |
| *F16D 13/74* | (2006.01) |
| *F16D 25/12* | (2006.01) |
| *F16H 57/04* | (2010.01) |
| *F16D 25/0638* | (2006.01) |
| *F16D 13/72* | (2006.01) |

(52) U.S. Cl.
CPC ............. *F16D 13/72* (2013.01); *F16D 13/52* (2013.01); *F16D 13/644* (2013.01); *F16D 13/683* (2013.01); *F16D 13/74* (2013.01); *F16D 25/0638* (2013.01); *F16D 25/123* (2013.01); *F16H 57/0473* (2013.01); *F16H 2200/201* (2013.01); *F16H 2200/2043* (2013.01); *F16H 2200/2066* (2013.01); *F16H 2200/2082* (2013.01)

(58) Field of Classification Search
CPC ........ F16D 13/52; F16D 13/644; F16D 13/72; F16D 13/74; F16D 2300/06; F16D 2300/0212
See application file for complete search history.

(56) References Cited

U.S. PATENT DOCUMENTS

| | | | |
|---|---|---|---|
| 1,742,804 A * | 1/1930 | Carhart | ................... F16D 13/72 192/113.23 |
| 2,205,629 A | 6/1940 | Peterson | |
| 4,958,712 A | 9/1990 | Suganuma et al. | |
| 5,988,335 A | 11/1999 | Kupferschmid et al. | |
| 6,244,407 B1 | 6/2001 | Kremer et al. | |
| 6,568,518 B2 | 5/2003 | Sarar | |
| 8,701,855 B2 | 4/2014 | MacMillian et al. | |
| 9,046,139 B2 | 6/2015 | Meyer et al. | |

(Continued)

*Primary Examiner* — Jacob S. Scott
*Assistant Examiner* — Lori Wu
(74) *Attorney, Agent, or Firm* — James Dottavio; Brooks Kushman P.C.

(57) ABSTRACT

A clutch for an automatic transmission includes a clutch pack having a first set of friction disks interleaved with a second set of friction disks. The clutch further includes an annulus having an outer surface connected to the first friction disks and an inner surface. The annulus defines oil holes extending from the inner surface to the outer surface to permit oil to flow from the inner surface to the clutch pack. Air passageways are defined in the annulus and extend through the annulus permitting air to flow from the inner surface to the clutch pack to reduce drag losses between the first and second sets of disks. Each of the air passageways have an entrance that is radially inboard of an entrance of each of the oil holes.

20 Claims, 4 Drawing Sheets

(56) References Cited

U.S. PATENT DOCUMENTS

| | | | |
|---|---|---|---|
| 9,091,305 B2 | 7/2015 | Penz et al. | |
| 2011/0024258 A1* | 2/2011 | Avny | F16D 13/72 |
| | | | 192/111.12 |
| 2015/0057125 A1* | 2/2015 | Pump | F16H 48/08 |
| | | | 475/160 |
| 2017/0167545 A1* | 6/2017 | Zhang | F16D 13/52 |

* cited by examiner

CLUTCH ASSEMBLY FOR AUTOMATIC TRANSMISSION

TECHNICAL FIELD

This disclosure relates to the field of automatic transmissions for motor vehicles. More particularly, the disclosure relates to clutch assemblies designed to improve fuel economy.

BACKGROUND

Many vehicles are used over a wide range of vehicle speeds, including both forward and reverse movement. Most engines operate efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most automatic transmissions include planetary gear sets that modify the speed ratio between the input and output shafts. A simple planetary gear set has a sun gear, a ring gear, planet gears meshing between the sun gear and the ring gear, and a planet carrier connected to each of the planet gears. Clutches are used to couple select components of the planetary gear sets with other components to create the various gear ratios of the transmission.

Multi-disk wet clutches are commonly used to hold the components of the planetary gear sets. The clutches include clutch packs having a set of separator plates interleaved with a set of friction plates. A friction material is applied to the faces of the friction plates. The friction plates are typically connected to a rotatable component, and the separator plates are typically connected to either a rotatable or a stationary component. In many cases, a hydraulic piston is used to frictionally engage the plates to lock the components to each other when the clutch is ON.

When the clutch is ON, the friction between the plates creates enough thermal energy to damage the clutch pack if not controlled. Oil, e.g., transmission fluid, is supplied to the clutch pack to cool the clutch pack. Typically, the oil is continuously supplied to the clutch pack despite only being needed when the clutch is ON. When the clutch is OFF, the oil creates drag losses between the plates due to viscous shear loss associated with the oil. The drag losses reduce efficiency of the transmission, which can reduce fuel economy of the vehicle.

Prior patents, such as U.S. Pat. No. 6,244,407, have proposed to selectively interrupt oil flow to the clutch when the clutch is OFF to reduce drag losses between the disks and plates.

SUMMARY

According to one embodiment, a clutch for an automatic transmission includes a clutch pack having a first set of friction disks interleaved with a second set of friction disks. The clutch further includes an annulus having an outer surface connected to the first friction disks and an inner surface. The annulus defines oil holes extending from the inner surface to the outer surface to permit oil to flow from the inner surface to the clutch pack. Air passageways are defined in the annulus and extend through the annulus permitting air to flow from the inner surface to the clutch pack to reduce drag losses between the first and second sets of disks. Each of the air passageways has an entrance that is radially inboard of an entrance of each of the oil holes.

According to another embodiment, a clutch hub includes an annulus supported for rotation about an axis. The annulus has an outer surface defining attachment features configured to engage with friction disks of a clutch pack. Oil holes are defined in the annulus and extend between the outer surface and an inner surface. Air nozzles are provided on the annulus. Each air nozzle has a collar raised from the inner surface and a bore extending through the collar and the annulus.

According to yet another embodiment, a clutch includes a clutch housing connected to first friction disks and a clutch hub having an annulus connected to second friction disks. The clutch hub defines oil holes each having an entrance on an inner surface of the annulus. Air passageways extend through the annulus and have an entrance inboard of the entrances of the holes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
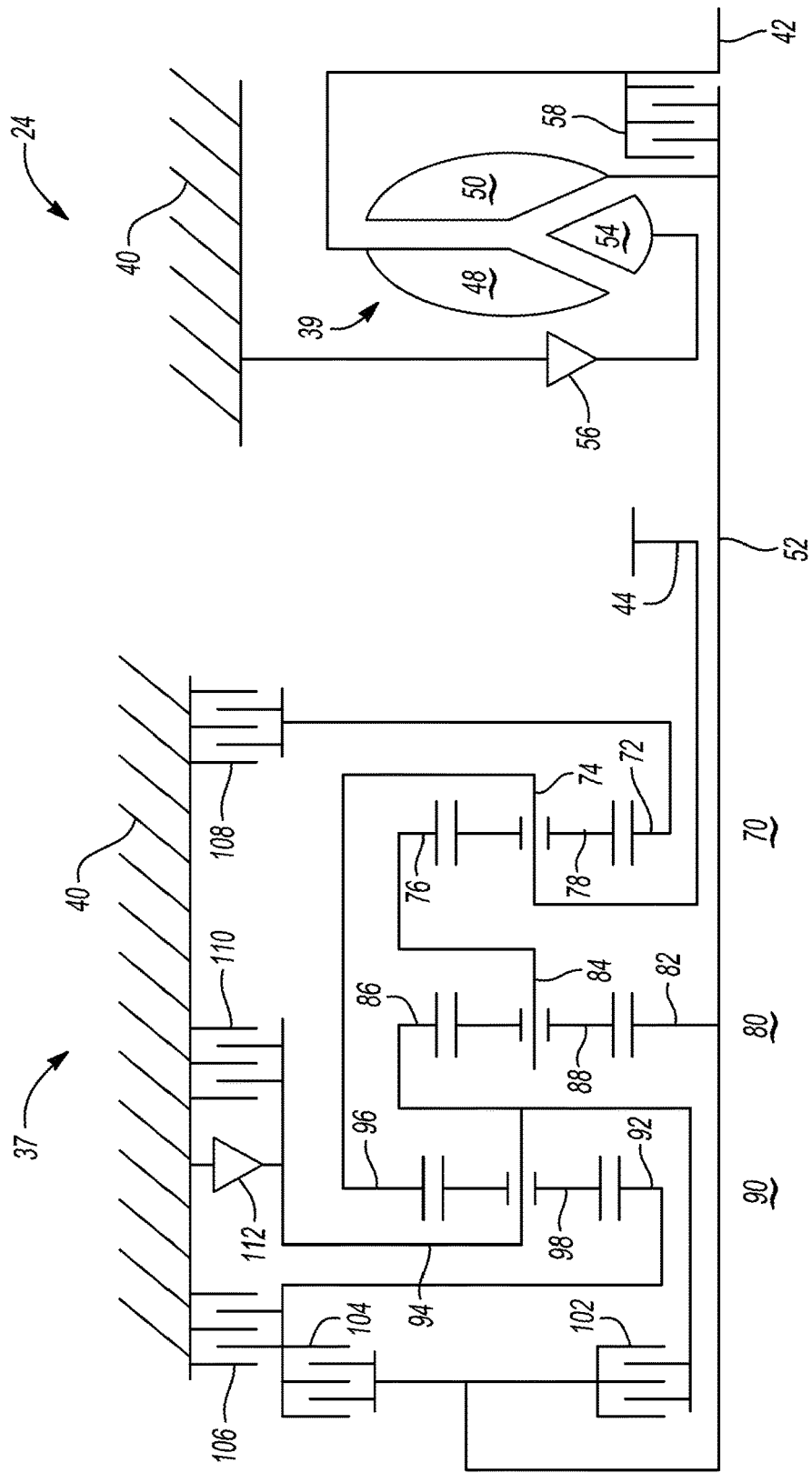
FIG. 1 is a schematic representation of a transmission according to one or more embodiments.

FIG. 1 illustrates a representative front-wheel drive automatic transmission. The teachings of this disclosure are also applicable to other types of automatic transmissions. The transmission is contained in a housing 40 that is fixed to a vehicle structure. An input shaft 42 is driven by the engine. The input shaft 42 may be connected to the engine via a damper that isolates the transmission from engine-torque pulsations. An output element 44 drives the driven wheels. The output element 44 may be driveably connected to the wheels via final-drive gearing and a differential. Two components are driveably connected if they are connected by a power flow path that constrains their rotational speeds to be directly proportional. The final-drive gearing transmits the power to a parallel axis and multiplies the torque by a fixed final-drive ratio. The final-drive gearing may include layshaft gears, a chain and sprockets, and/or planetary gearing. The differential divides the power between left and right front wheels while permitting slight speed differences as the vehicle turns. All-wheel-drive vehicles may include a power take-off unit that transfers power to rear wheels.

A torque converter 39 has an impeller 48 fixed to the input shaft 42 and a turbine 50 fixed to the turbine shaft 52. The torque converter 39 transmits torque from the input shaft 42 to the turbine shaft 52 while permitting the turbine shaft 52 to rotate slower than the input shaft 42. When the turbine shaft 52 rotates substantially slower than the input shaft 42, a torque converter stator 54 is held against rotation by the one way clutch 56 such that the torque applied to the turbine shaft 52 is a multiple of the torque supplied at the input shaft 42. When the speed of the turbine shaft 52 approaches the speed of the input shaft 42, the one way clutch 56 overruns. The torque converter 39 also includes a lock-up clutch 58 that selectively couples the input shaft 42 to turbine shaft 52.

The gear box 37 establishes a number of speed ratios between the turbine shaft 52 and the output element 44. Specifically, the gear box 37 has three planetary gear sets and six shift elements that establish six forward and one reverse speed ratio. A shift element that selectively holds a gear element against rotation is sometimes called a brake whereas a shift element that selectively couples two rotating elements to one another is sometimes called a clutch. For this application, the term "clutch" is generic and covers both of these types of shift elements. Simple planetary gear sets 70, 80, and 90 each have a sun gear (72, 82, 92), a carrier (74, 84, 94), and a ring gear (76, 86, 96) that rotate about a common axis. Each planetary gear set also includes a number of planet gears (78, 88, 98) that rotate with respect to the carrier and mesh with both the sun gear and the ring gear. Carrier 74 is fixedly coupled to ring gear 96 and output element 44, carrier 84 is fixedly coupled to ring gear 76, ring gear 86 is fixedly coupled to carrier 94, and sun gear 82 is fixedly coupled to the turbine shaft 52.

The various speed ratios are established by engaging various combinations of clutches. Clutches 102 and 104 selectively couple the turbine shaft 52 to carrier 94 and sun gear 92, respectively. Clutches 106 and 108 selectively hold sun gear 92 and sun gear 72, respectively, against rotation. Clutch 110 selectively holds carrier 94 against rotation. Finally, the one-way clutch 112 passively holds carrier 94 against rotation in one direction while allowing rotation in the opposite direction.

Figure 2:
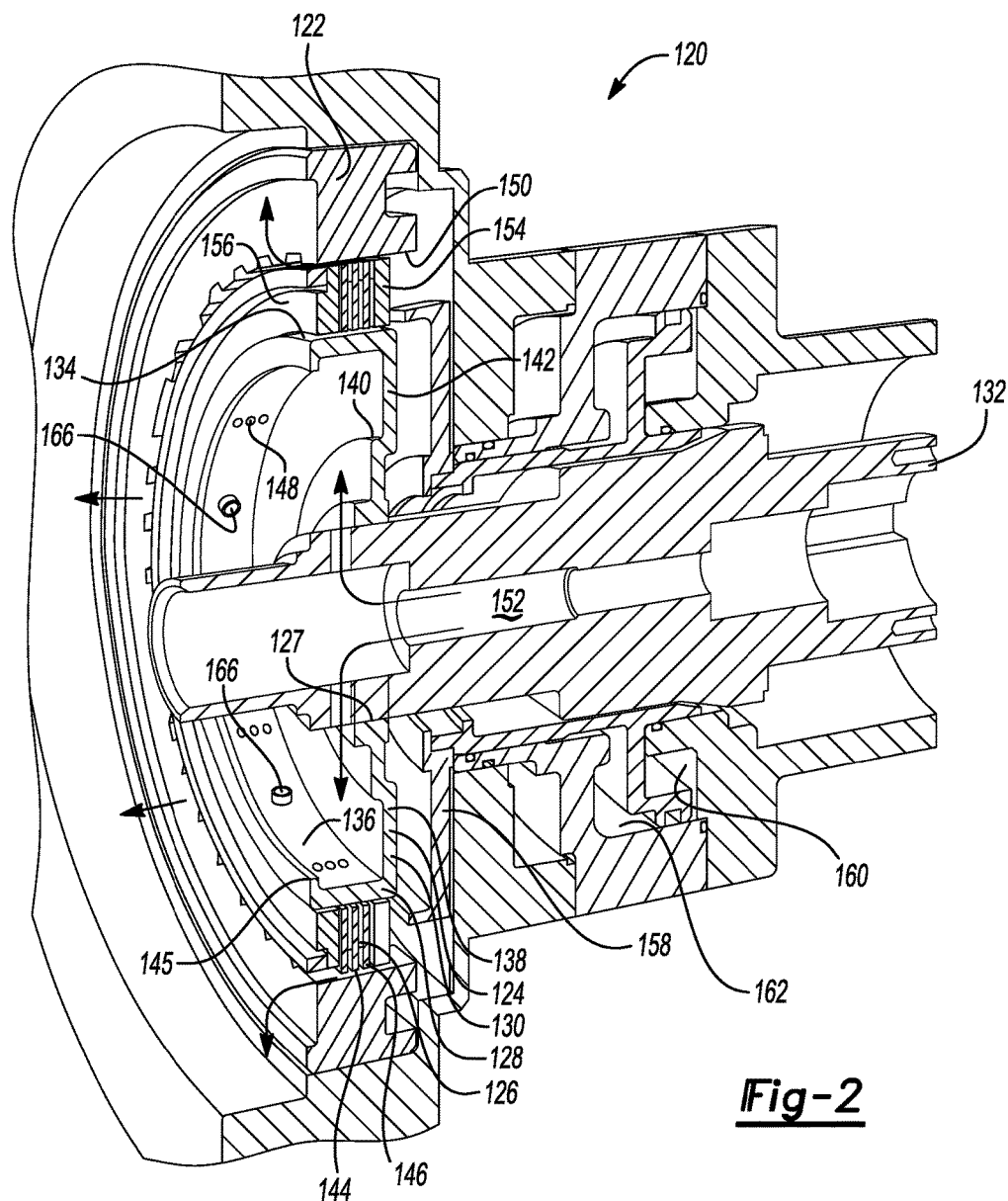
FIG. 2 is a perspective view, in cross section, of a clutch of the transmission according to one or more embodiments.
Figure 3:
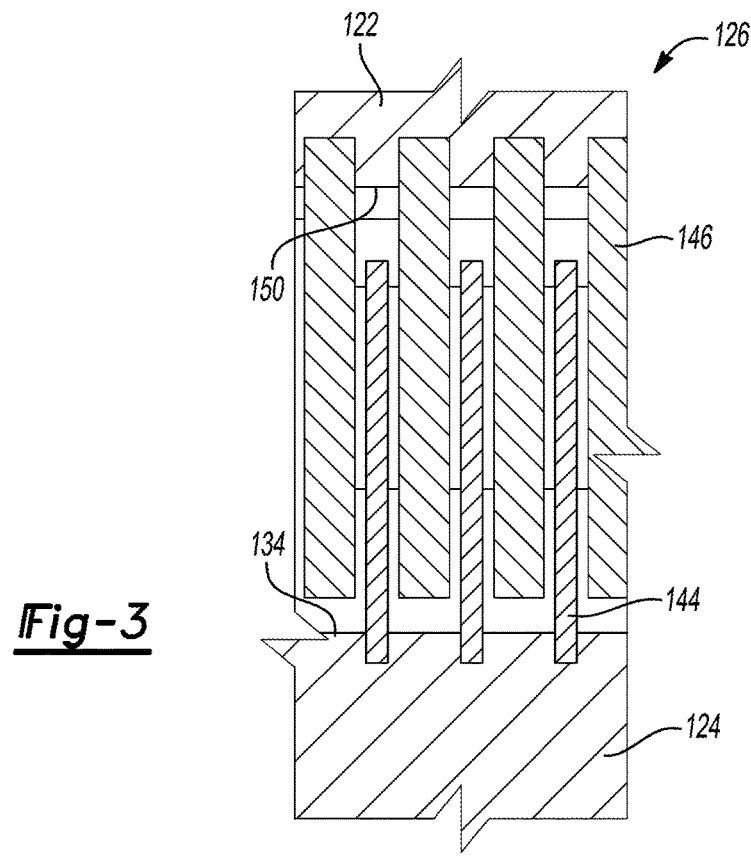
FIG. 3 is a magnified fragmentary cross-sectional view of a clutch pack of the clutch of FIG. 2.

The following figures and related text describe example clutches that may be used in the transmission 24 or any other automatic transmission that uses hydraulic clutches. Referring to FIGS. 2 and 3, a clutch 120 includes a clutch housing 122, a clutch hub 124, and a clutch pack 126 radially disposed between the housing 122 and the hub 124. The clutch hub 124 defines a central bore 127 that is connected to a first rotatable component 132 such as the turbine shaft or other rotatable component. The central bore 127 may define splines that engage with teeth on the outer surface of the rotatable component 132. The clutch hub 124 also includes an annulus 128 adjacent to the clutch pack 126 and a wall portion 130 that generally extends radially between the annulus 128 and the central bore 126. The wall portion 130 includes a plurality of segments such as a first segment 138, a second segment 140, and third segment 142. Each of the segments may extend radially, axially or at an oblique angle depending upon the design of the gear box. The clutch housing 122 may be connected to a second rotatable component such as a component of a planetary gear set or it may be connected to a stationary object such as the transmission case.

The annulus 128 defines an outer surface 134 and an inner surface 136. A raised lip 145 is formed on a forward end of the annulus 128 and is raised above the inner surface 136. The lip 145 and the wall portion 130 cooperate to define an oil reservoir disposed around the circumference of the clutch hub 124. A plurality of oil holes 148 are defined through the annulus 128 and extend from the inner surface 136 to the outer surface 134 to supply oil to the clutch pack 126.

The clutch pack 126 includes a plurality of friction plates 144 interleaved with a plurality of separator plates 146. These plates may be generically referred to as friction disks. Each of the friction plates 144 may include a core and a friction material applied to an outer surface of the core. The friction material could also be on the separator plates. A pressure plate 154 and a reaction plate 156 may be disposed on the outer ends of the clutch pack and sandwiched the friction plates 144 and the separator plates 146.

The outer surface 134 of the annulus is connected with each of the friction plates 144 of the clutch pack via a spline or other suitable connection. The inner surface 150 of the clutch housing 122 is connected with each of the separator plates 146 of the clutch pack via a spline or other suitable connection. The clutch pack selectively locks the housing 122 to the hub 124 when the clutch pack is engaged and allows relative rotation between the housing 122 and the hub 124 when the clutch pack is disengaged.

The clutch pack 126 may be actuated by a hydraulic piston 158. The piston 158 frictionally engages the friction plates 144 with the separator plates 146 when oil is supplied to the supply chamber 160. A balance chamber 162 biases the piston 158 away from the clutch pack 126 when the clutch 120 is disengaged. A spring or other biasing member (not shown) may be disposed within the balance chamber 162 to bias the piston away from the clutch pack 126.

The clutch pack 126 is cooled by oil, e.g., transmission fluid, to dissipate heat generated by the friction disks. Oil may be supplied to the clutch hub 124 via one or more passageways 152 defined in the first rotatable component 132. Centrifugal forces move the oil, which is pooled on the inner surface 136, through the oil holes 148 to lubricate the clutch pack. The oil then circulates from the clutch pack, through the clutch housing, and to the oil sump of the transmission for recirculation. Typically, the oil is continuously supplied to the clutch pack despite only being needed when the clutch is engaged. When the clutch is disengaged, an oil film forms on the friction disks and creates drag between the disks due to viscous shear losses associated with the oil. The drag losses reduce efficiency of the transmission, which can reduce fuel economy of the vehicle. In standard clutch hub designs, the oil layer prevents air from entering into the clutch pack and breaking up the oil film.

Figure 4:
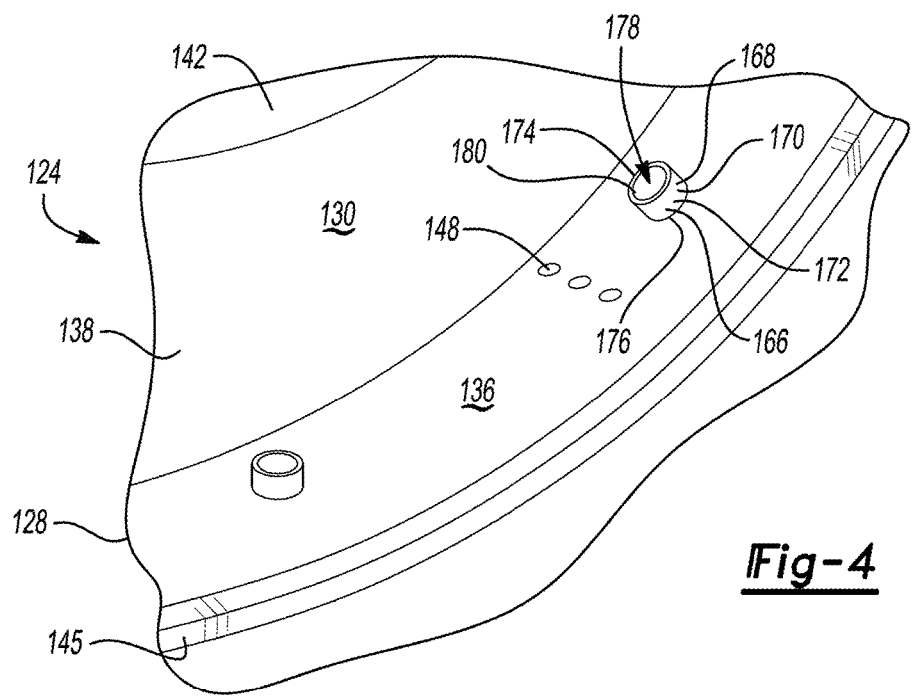
FIG. 4 is a magnified fragmentary view of the clutch of FIG. 2.

Referring to FIGS. 2 and 4, the clutch hub 124 includes a plurality of air nozzles 166 that introduce air into the clutch pack 126 to reduce the volume of oil in the clutch pack 126 and thus reduce the shear losses between the friction disks when the clutch 120 is disengaged. The air nozzles 166 may be disposed on the inner surface 136 of the annulus 128. In some embodiments, the air nozzles 166 are integrally formed with the clutch hub 124. For example the clutch hub 124 may be a casting that includes the air nozzles 166. Each of the air nozzles 166 may include a collar 168 that extends radially inward from the inner surface 136 such that the air nozzles are raised above the inner surface 136. The collars 168 may include a tubular body 170 having a sidewall 172, a top 174, and a bottom 176. A bore 178 extends completely through the collar 168 and completely through the annulus 128 with a first section of the bore 178 being defined by the sidewall 172 and a second section of the bore being defined by the annulus 128. The bore 178 allows air to circulate from within the clutch hub 124 to the clutch pack 126.

The top 174 defines an entrance 180 of the bore. The height of the collars 168 are tall enough to place the top 174 above the layer of oil pooled on the annulus 128 to prevent oil from entering into the entrances 180 of the bores 178. Without this raised collar 168, oil would plug the air nozzles 166 preventing air from entering into the clutch pack 126. The collar may be raised above the inner surface 136 by 2 to 7 millimeters. The air nozzles 166 may be arranged on the annulus 128 with equal spacing between each of the air nozzles. In some embodiments, the top 174 may rise above the lip 145 to ensure oil does not enter the bores 178. In some designs, it is advantageous for the diameter of the bores 178 to be larger than the diameter of the oil holes 148. But, in other designs the oil holes may be larger than the bores.

Figure 5:
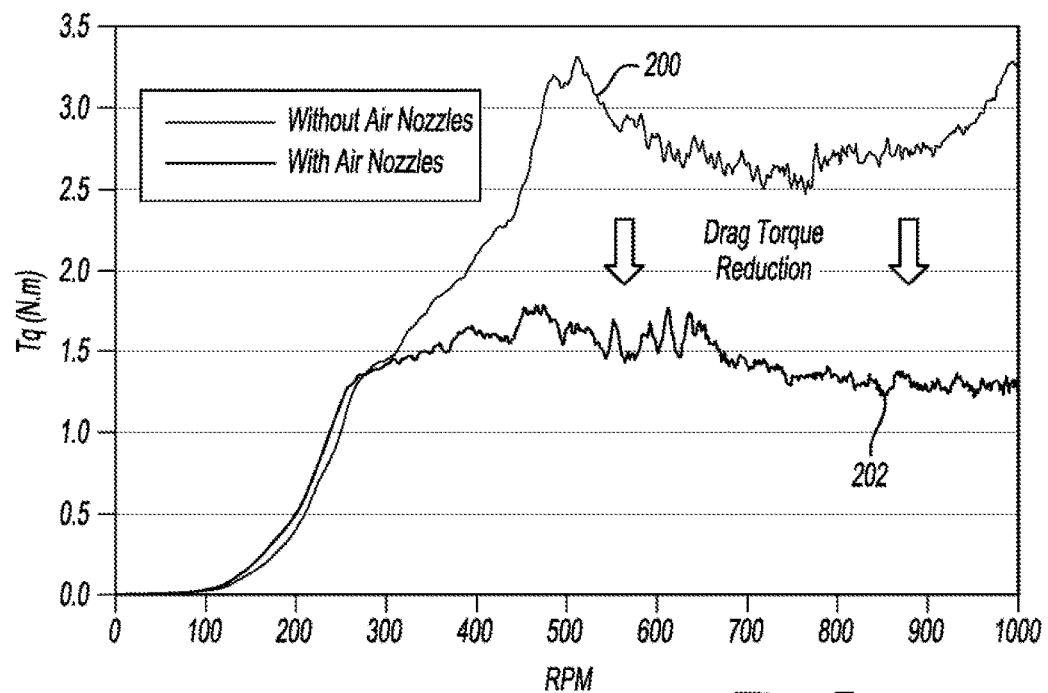
FIG. 5 illustrates test data plots of the drag torque for a clutch without air nozzles and for the clutch of FIG. 2 that has air nozzles.

By introducing air into the clutch pack 126 when disengaged, the oil film between the friction plates is broken up and the drag losses of the clutch are reduced. FIG. 5 illustrates the drag losses of the clutch 120 with and without the air nozzles. Plot 200 illustrates the drag losses of the clutch without air nozzles, and plot 202 illustrates the drag losses of the clutch with air nozzles. The plots were developed using computational fluid dynamics (CFD) modeling. The inclusion of the air nozzles significantly reduced the drag torque of the clutch.

Adding air nozzles reduces the drag torque of the disengaged clutch without the need to inhibit oil flow to the clutch. In this regard, the air nozzles of this disclosure can be retrofitted to existing clutches without the need for substantial or perhaps any modification other than the addition of the air nozzles. In contrast, solutions that propose to inhibit oil flow are complex, require additional components and cannot be retrofitted to current production transmissions as easily as the air nozzles of this disclosure. Thus, the addition of the air nozzles provides a flexible and economical solution to the lingering problem of clutch drag losses.

Figure 6:
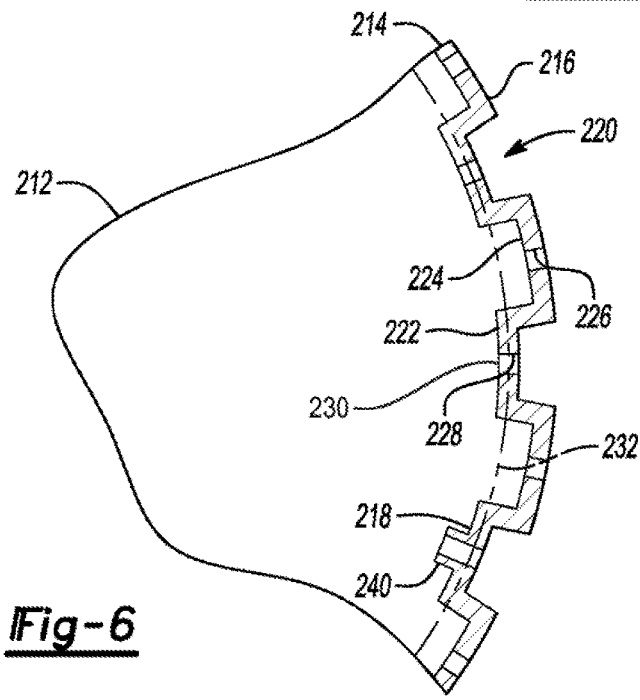
FIG. 6 is a fragmentary front cross-sectional view of a clutch hub according to one or more embodiments.

FIG. 6 illustrates a clutch hub 212 according to another embodiment. The clutch hub 212 includes an outer surface 216 having splines 220. To reduce materials and weight, the wall thickness of the annulus 214 may be reduced by stepping the inner surface 218 to match the splines of the outer surface 216. Thus, the inner surface 218 includes inboard segments 222 and outboard segments 224. The oil holes 226 may be defined in the outboard segments 224 and the air nozzles 228 may be defined in the inboard segments 222. In this embodiment, the air nozzles 228 may not require collars as the stepped surface places the entrance 230 of the air nozzles 228 inboard of the oil layer 232. In some embodiments, collars may be added to the air nozzles 228 if the radial offset between the inboard segments 222 and the outboard segments 224 is insufficient to place the entrance 230 above the oil layer. See Collar 240 for example.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch for an automatic transmission comprising:
 a clutch pack having a first set of friction disks interleaved with a second set of friction disks;
 an annulus having an outer surface connected to the first friction disks and an inner surface, the annulus defining oil holes extending from the inner surface to the outer surface to permit oil to flow from the inner surface to the clutch pack; and
 air passageways extending through the annulus permitting air to flow from the inner surface to the clutch pack to reduce drag losses between the first and second sets of disks, wherein each of the air passageways has an entrance that is radially inboard and offset of an entrance of each of the oil holes.

2. The clutch of claim 1, wherein each of the air passageways has an associated projection extending radially inboard from the inner surface such that the projection defines a first segment of the air passageway and the annulus defines a second segment of the air passageway.

3. The clutch of claim 2, wherein the projection has a tubular body.

4. The clutch of claim 2, wherein the projection is integrally formed with the annulus.

5. The clutch of claim 1 further comprising an annular lip extending radially inboard from an edge portion of the inner surface.

6. The clutch of claim 5, wherein the entrances of the air passageways are radially inboard and offset of the lip.

7. The clutch of claim 1, wherein the air passageways are arranged on the inner surface with equal spacing between adjacent air passageways.

8. The clutch of claim 1, wherein the air passageways have a larger diameter than the oil holes.

9. The clutch of claim 1, wherein the inner surface includes radially inboard segments and radially outboard segments, and the oil holes are defined in the outboard segments and the air passageways are defined in the inboard segments.

10. A clutch hub comprising:
 an annulus supported for rotation about an axis and including:
  an outer surface defining attachment features configured to engage with friction disks of a clutch pack,
  an inner surface,
  oil holes extending through the annulus, and
  air nozzles each having a collar raised from the inner surface and a bore extending through the collar and the annulus.

11. The clutch hub of claim 10, wherein the collar has a tubular body including an end and at least one sidewall radially extending between the end and the inner surface.

12. The clutch hub of claim 11, wherein the top defines an entrance of the bore, and the entrance is radially inboard and offset of an entrance of the oil holes.

13. The clutch hub of claim 10, wherein the air nozzles are integrally formed with the annulus.

14. The clutch hub of claim 10, wherein the inner surface includes radially inboard segments and radially outboard segments, and the oil holes are located on the outboard segments and the air nozzles are located on the inboard segments.

15. The clutch hub of claim 10 further comprising a wall portion connected to the annulus and extending radially inward therefrom.

16. A clutch comprising:
   a clutch housing connected to first friction disks;
   a clutch hub having an annulus connected to second friction disks and defining oil holes each having an entrance on an inner surface of the annulus; and
   air passageways extending through the annulus and having an entrance radially inboard and offset of the entrances of the holes.

17. The clutch of claim 16, wherein each of the air passageways has an associated collar extending radially inboard from the inner surface, and the collar defines a inner segment of the air passageway and the annulus defines an outer segment of the air passageway.

18. The clutch of claim 17, wherein the collars are integrally formed with the annulus.

19. The clutch of claim 17, wherein each of the collars has a tubular body having an inboard face raised from the inner surface and at least one sidewall extending between the face and the inner surface and wherein the entrance of the air passageways is located on the inboard face.

20. The clutch of claim 16, wherein the clutch hub is connected to a first rotatable component and the clutch housing is associated with a second rotatable component, wherein the clutch locks the first and second rotatable components when the first disks are engaged with the second disks.

* * * * *